(No Model.)
W. G. PARMELEE.
CORN AND POTATO CULTIVATOR AND HILLER COMBINED.
No. 307,979. Patented Nov. 11, 1884.
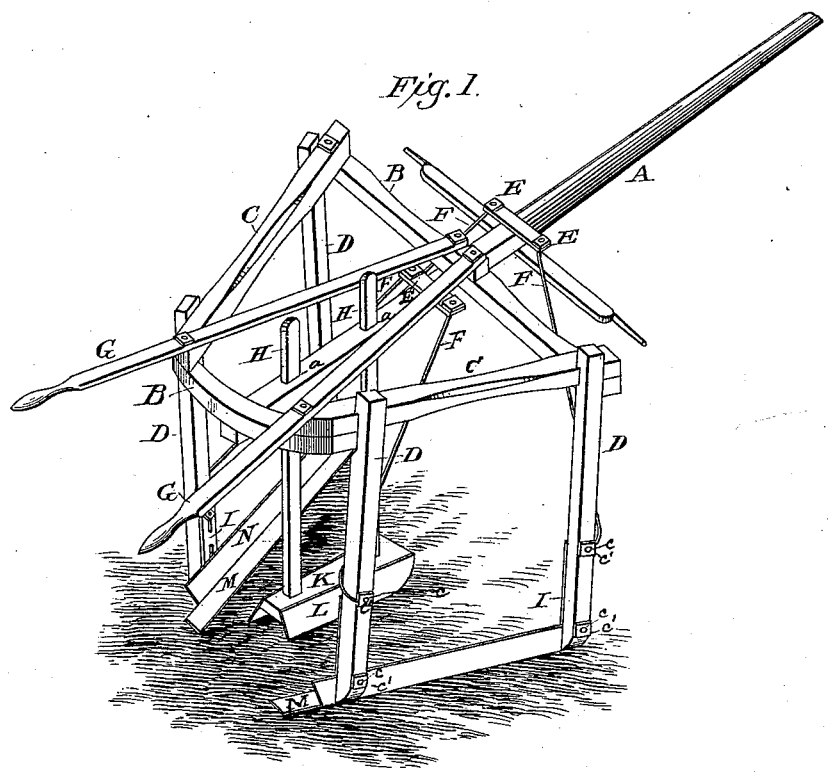
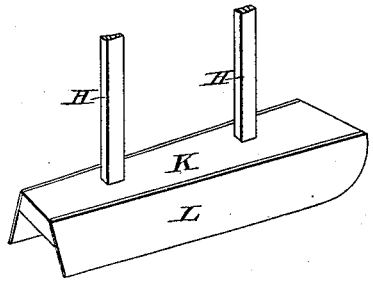
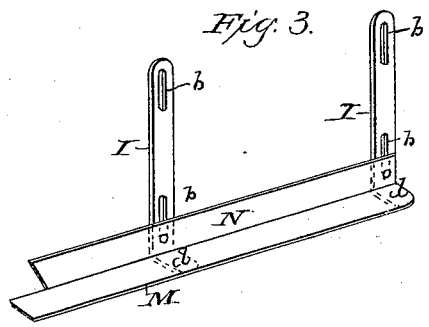
Witnesses:
Frank M Merrill
Elbert L. Fisher
Inventor:
William G. Parmelee

United States Patent Office.

WILLIAM G. PARMELEE, OF LE ROY, NEW YORK.

CORN AND POTATO CULTIVATOR AND HILLER COMBINED.

SPECIFICATION forming part of Letters Patent No. 307,979, dated November 11, 1884.

Application filed March 12, 1883. (No model.)

*To all whom it may concern:*

Be it known that I, WILLIAM G. PARMELEE, a citizen of the United States, residing at Le Roy, in the county of Genesee and State of New York, have made certain new and useful Improvements in Corn and Potato Cultivators, of which the following is a full, clear, and exact description, reference being had to the accompanying drawings and letters of reference marked thereon, in which—

Figure 1 is a perspective view of my improved cultivator. Fig. 2 is a similar view of the protector for the plants, and Fig. 3 is a similar view of the cultivating knife or blade detached with the hiller attached.

Similar letters indicate like parts in all the figures.

My invention relates to improvements in cultivators for corn and potatoes; and it consists in the peculiar construction and arrangement of the parts, as hereinafter more fully described, and set forth in the claims.

A represents the tongue of my improved cultivator, provided near its rear end with recesses adapted to receive the cross-bars B B of the cultivator-frame, which cross-bars B B are of unequal length and bolted to the tongue in said recesses.

C C represent inclined side bars bolted to the ends of the cross-bars B B.

D D represent standards, two on each side of the trapezoidal frame B C, secured to the latter near their ends and pendent vertically downward therefrom.

E E represent metallic cross-pieces, each perforated at its ends and secured to the upper face of the tongue A.

F F represent iron rods threaded at their upper ends. Each pair of iron rods F F pass at their upper ends through the holes in the ends of the metallic cross-pieces E E, and are adjustably secured to the latter by means of nuts *m n* on opposite sides of the metallic cross-pieces E. The rods F F are inclined downwardly and rearwardly from the cross-pieces E, and are each bent half around a standard D near its lower end, and secured to the latter by a bolt, *c*, and nut *c'*. The knives M and hillers N, which will be presently described, are secured to the lower ends of the standards D and make an obtuse angle with each other; and by means of the above-described construction the knives M and hillers N, which are capable of a lateral movement, can be drawn to or from the hills, thereby varying the pitch of the knives by adjusting the nuts on the rods F F and on opposite sides of the cross-pieces E; or, in other words, the knives and hillers can be laterally adjusted somewhat to and from a row of plants by the described construction, thus changing the pitch of the knives.

I I represent metallic plates bent angularly at their lower ends at *d*.

M M represent diagonal knives converging toward each other at their rear ends, straddling the row of plants to be cultivated, and bolted to the bends *d* of the metallic plates I I. The plates I are each provided with slots *b b*, and are secured to the inner faces of the standards D by bolts *c* and nuts *c'*. The lower bolts *c* also pass through the hiller N. By this construction the knives M and hillers N can be adjusted vertically, so as to raise or lower them to cultivate deeper or shallower.

G G are the cultivator-handles bolted to the trapezoidal frame B C on opposite sides of the tongue.

K L represent the protector for young plants, designed to prevent injury to the row of plants which it straddles by stones or clods of dirt striking the plants in the forward movement of the cultivator. The protector consists of a wooden trapezoidal top, K, with its widest end arranged toward the front of the cultivator, and provided with beveled longitudinal sides, to which are secured outwardly-inclined metallic plates L. In the forward movement of the cultivator the protector straddles and covers the upper ends of the small plants and protects them from being struck by the stones and clods of dirt thrown toward them by the knives and hillers.

H H are vertical bars secured at their lower ends to the top face, K, of the protector, and passing through the mortises *a a* in the rear end of the tongue.

Holes may be made in the bars H and in the tongue, and the protector thus vertically adjusted as desired by bolts passing through the tongue and bars H.

Having thus fully described my invention, what I claim as new, and desire to secure by Letters Patent, is—

1. The combination, with the trapezoidal frame B C and standards D, having their upper ends secured thereto, of the slotted plates I, having the lower bent ends, $d$, knife M, secured to the bent ends $d$, hiller N, and bolts $c$, substantially as shown and described.

2. The combination, with the tongue A, having mortises $a\ a$, and frame B C D, carrying knives and hillers M N, of a protector consisting of a top, K, inclined sides L, and standards H, passing through the mortises $a$ of the tongue and adjustably secured thereto, substantially as shown and described.

WILLIAM G. PARMELEE.

Witnesses:
AARON ARNOLD,
ROBERT MARSHALL.